Patented Mar. 16, 1926. 1,577,369

UNITED STATES PATENT OFFICE.

GEORGE E. SANDERS AND RAYMOND H. PESTELL, OF LOUISVILLE, KENTUCKY, ASSIGNORS TO DOSCH CHEMICAL CO., A CORPORATION OF DELAWARE.

NICOTINE DUST FOR KILLING INSECTS.

No Drawing. Application filed September 1, 1922. Serial No. 585,801.

*To all whom it may concern:*

Be it known that we, GEORGE E. SANDERS, a citizen of Canada, and a resident of Louisville, Kentucky, and RAYMOND H. PESTELL, a citizen of the United States, a resident of Louisville, in the county of Jefferson and State of Kentucky, have invented certain new and useful Improvements in Nicotine Dust for Killing Insects, of which the following is a specification.

Our invention relates particularly to a composition which is very efficacious in the killing of insects of all kinds but especially sucking or breathing insects, that is to say those which can be killed by contact with or breathing poisonous materials and which has an extraordinary toxicity in regard to the same.

The object of our invention is to provide a nicotine dust with which insects of the above character may be readily exterminated, inasmuch as our composition contains not only nicotine in a volatile form but also ammonia which appears to increase the effect of the nicotine upon the insects, owing, probably, to the increase in the respiratory function of the insects. A further object is to provide a composition of this kind, the constituents of which are of such character as to immediately release a large proportion of the nicotine and ammonia. Also in our process there is a very small amount of the toxic substances wasted and with consequent safety to the workman. Further objects of our invention will appear from the detailed description thereof hereinafter.

While our invention is capable of embodiment in many different forms, for the purpose of illustration we have described only certain forms thereof hereinafter.

For example, in carrying out our invention we may produce a composition containing any desired proportions of the ingredients but, for instance, 1% to 10% of nicotine sulphate, from 1 to 10% of ammonium sulphate, from 20 to 50% of magnesium oxide and from 50 to 75% of calcium oxide. For example, a specific composition might comprise 10% of nicotine sulphate, 10% of ammonium sulphate, 30% of magnesium oxide and 50% of calcium oxide, aside from the moisture present. In producing the composition, preferably, we use a 40% solution of nicotine sulphate with water, to which there is added the amount of ammonium sulphate to be used. These ingredients are then mixed with the quantity of magnesium oxide to be introduced and the materials are then ground and allowed to stand for at least twenty-four hours. The magnesium oxide serves as a very effective absorbent and carrier for the water present. This composition is now mixed with the quantity of calcium oxide to be used. The effect of the calcium oxide or fresh quick lime is to take up some of the water from the magnesium oxide thus producing an increase in temperature and liberating nicotine and ammonia from their compounds by the union of the lime with the sulphate radicals in the nicotine and ammonium compounds. This compositon is allowed to stand for twenty-four hours in a sealed container and is then ready to be used as, for example, by dusting plants therewith which are infested with insects. The nicotine and ammonia are immediately available in the form of vapors or gases and will quickly kill the insects owing to the breathing of the toxic vapors by the same.

Instead of the magnesium oxide other absorbents may be used as, for example, diatomaceous earth, fuller's earth, plaster of Paris, tobacco waste, etc. used singly or together. Furthermore, if desired, either the nicotine or ammonia, or both, may be introduced into the composition as such, instead of in the form of salt. As a further modification the nicotine and ammonia may be introduced into the composition together with a salt of nicotine and an ammonium salt. Where nicotine and ammonia are introduced as such instead of the quick lime, calcium hydroxide or other light powder might be used. In order to introduce the nicotine as such this may be accomplished if desired by previously treating the nicotine sulphate initially, before admixture with the other ingredients, with an alkali such as sodium hydroxide, ammonium hydroxide, ammonia gas, barium hydroxide or potassium hydroxide. The use of magnesium and calcium lime will give a greater liberation of nicotine than either calcium oxide or magnesium oxide alone. There are, however, certain disadvantages in adding simultaneously mixed magnesium and calcium lime in the manufacture of nicotine dusts. We, therefore, prefer to obtain the same benefits and avoid the disadvantages. The nicotine sulphate is added to magnesium oxide, which has high absorbing power and still is somewhat inactive in liberating free nicotine. To this base we add finely ground burned lime or calcium oxide which, both directly and alone and in combination with magnesium oxide, causes a rapid liberation of free nicotine.

While we have described our invention above in detail we wish it to be understood that many changes may be made therein without departing from the spirit of the same.

We claim:

1. A composition containing nicotine and ammonia.
2. A composition in the form of a dust containing nicotine and ammonia.
3. A composition containing nicotine, ammonia and a moisture absorbent.
4. A composition in the form of a dust containing nicotine, ammonia and a moisture absorbent.
5. A composition containing nicotine, ammonia, a moisture absorbent and a fine powdery material.
6. A composition in the form of a dust containing nicotine, ammonia, a moisture absorbent and a fine powdery material.
7. A composition containing nicotine, ammonia, a moisture absorbent, quick lime, a salt of nicotine and an ammonium salt.
8. A composition in the form of a dust containing nicotine, ammonia, a moisture absorbent, quick lime, a salt of nicotine and an ammonium salt.
9. A composition containing nicotine, ammonia, a moisture absorbent, quick lime, nicotine sulphate and ammonium sulphate.
10. A composition in the form of a dust containing nicotine, ammonia, a moisture absorbent, quick lime, nicotine sulphate and ammonium sulphate.
11. A composition containing nicotine, ammonia, magnesium oxide, quick lime, nicotine sulphate and ammonium sulphate.
12. A composition in the form of a dust containing nicotine, ammonia, magnesium oxide, quick lime, nicotine sulphate and ammonium sulphate.

In testimony that we claim the foregoing, we have hereunto set our hands this 5th day of August, 1922.

GEORGE E. SANDERS.
RAYMOND H. PESTELL.